United States Patent [19]
Ohga et al.

[11] Patent Number: 5,674,305
[45] Date of Patent: Oct. 7, 1997

[54] METHOD FOR FLAME ABRASION OF GLASS PREFORM

[75] Inventors: Yuichi Ohga; Susumu Uchida, both of Yokohama, Japan

[73] Assignee: Sumitomo Electric Industries, Ltd., Osaka, Japan

[21] Appl. No.: 498,425

[22] Filed: Jul. 5, 1995

Related U.S. Application Data

[63] Continuation of Ser. No. 199,016, Feb. 18, 1994, abandoned.

[30] Foreign Application Priority Data

Feb. 22, 1993 [JP] Japan .................. 5-031818

[51] Int. Cl.⁶ .................................. C03B 37/027
[52] U.S. Cl. ..................... 65/377; 65/61; 65/65; 65/120; 65/404
[58] Field of Search ............ 65/120, 61, 65, 65/416, 377, 414, 404

[56] References Cited

U.S. PATENT DOCUMENTS

| | | | |
|---|---|---|---|
| 3,485,613 | 12/1969 | Herczog | 65/120 |
| 3,652,248 | 3/1972 | Loxley | 65/120 |
| 3,811,857 | 5/1974 | Deeg | 65/65 |
| 3,961,926 | 6/1976 | Asam | 65/120 |
| 4,477,273 | 10/1984 | Lynch | 65/120 |
| 4,645,451 | 2/1987 | Schneider | 65/120 |
| 5,192,350 | 3/1993 | LeSergent | 65/61 |
| 5,338,327 | 8/1994 | Ohga | 65/61 |

FOREIGN PATENT DOCUMENTS

| | | | |
|---|---|---|---|
| 631948 | 6/1991 | Australia . | |
| 0440130 | 1/1991 | European Pat. Off. . | |
| 519468 | 6/1992 | European Pat. Off. . | |
| 0519479 | 12/1992 | European Pat. Off. . | |
| 0525681 | 2/1993 | European Pat. Off. . | |
| 2-160636 | 6/1990 | Japan . | |
| 3228844 | 10/1991 | Japan . | |
| 585763 | 4/1993 | Japan | 65/65 |
| 8200635 | 3/1982 | WIPO | 65/120 |

*Primary Examiner*—John Hoffmann
*Attorney, Agent, or Firm*—Cushman Darby & Cushman IP Group of Pillsbury Madison & Sutro, LLP

[57] ABSTRACT

The present invention relates to a process wherein a large glass preform is flame abraded to have a clear and smooth surface. In particular, the present invention pertains to a method for flame abrading a surface of a rotating glass preform by an oxyhydrogen flame which moves along a length of the glass preform, in which a movement velocity of the oxyhydrogen flame or a flow rate of oxyhydrogen of the oxyhydrogen flame is varied to conduct the flame abrasion treatment.

8 Claims, 1 Drawing Sheet

Unsintered soot part — Site e
Ineffective part — Site d
— Site c
Effective part
— Site b
Ineffective part — Site a $SiCl_4, H_2, O_2, Ar$

METHOD FOR FLAME ABRASION OF GLASS PREFORM

This is a continuation of application Ser. No. 08/199,016, filed on Feb. 18, 1994, which was abandoned.

FIELD OF THE INVENTION

The present invention relates to a method for flame abrading a heavy glass preform in a vertically-oriented position. Particularly, it relates to a method for flame abrading (i.e., flame polishing and/or thermal machining) a large heavy glass preform wherein an ineffective part is flame abraded and an unsintered part of the glass preform, which cannot be converted to a transparent one by conventional thermal treatment during sintering a porous preform, is nevertheless converted to a transparent glass.

DESCRIPTION OF THE RELATED ART

Hitherto, as a method for preparing a high purity quartz glass preform (hereinafter referred to as "glass preform"), a VAD (Vapor Phase Axial Deposition) method, an OVD (Outside Vapor Deposition) method and the like are known. These methods generally comprise depositing silica ($SiO_2$) glass fine particles prepared by the hydrolysis reaction of a $SiCl_4$ raw material with an oxyhydrogen flame on an outer surface of a rotating starting rod such as a silica rod, forming a porous preform in an axial direction, and then converting the porous preform to a transparent glass to prepare a glass preform for an optical fiber. Since the resultant glass preform, which is a transparent glass, has a surface having, roughness of a few micrometers, the surface of the glass preform is flame abraded to give a smooth surface and then the glass preform is drawn and spun. Generally, since a lathe for the flame abrasion is horizontal type, support rods are attached to both ends of the glass preform. The support rods are fixed to the lathe by means of chucks and then the glass preform is flame abraded with moving oxyhydrogen burners.

Recently, in view of a lower cost of an optical fiber, a larger preform has been provided by increasing a diameter and/or length of the glass preform. In the case of such horizontal type lathe, when the preform has a heavier weight and is supported by only the support rods, there is a danger that one or both of the support rods may be broken because of a heavy load. In order to solve this problem, a method comprising holding the glass preform vertically is proposed (cf. Japanese Patent Kokai Publication No. 228844/1991).

However, when the upper ineffective part of the preform is sufficiently heated so as to convert the ineffective part to a transparent glass during the thermal treatment step (the sintering step) for making a transparent glass in order to increase an effective coefficient of utilization, a problem arises inasmuch as the support rod is elongated because of the preform weight. Namely, the ineffective part cannot be completely converted to transparent glass during the sintering step so that an unsintered soot (unsintered fine glass particle's) remains at an end of the glass preform and at the support rod. The unsintered soot floats in an oven during the drawing step and it adheres to the glass preform so that the spun fiber has a decreased strength. Therefore, it is necessary to convert the unsintered soot to the transparent glass. However, when the heat is applied sufficiently to convert the unsintered soot adhered to the support rod during the flame abrasion step to the transparent glass, the support rod is elongated due to the heavy weight of the preform so that the good flame abraded preform cannot be obtained. To overcome this problem, the present inventors have investigated the placement of a support rod at a lower end of the preform to prevent the elongation of the support rod. However a rotational axis at the end of the rotating preform does not necessarily corresponds to a center of chuck and the support rod may consequently be broken when the support rod is forced to be held.

SUMMARY OF THE INVENTION

The present invention provides a method for flame abrading a surface of a rotating glass preform by an oxyhydrogen flame which moves along a length of the glass preform, wherein a velocity of the movement of the oxyhydrogen flame is varied to conduct the flame abrasion treatment. Flame abrading is defined herein as being directed to the processes of flame polishing and/or thermal machining.

The present invention also provides a method for flame abrading a surface of a rotating glass preform by an oxyhydrogen flame which moves along a length of the glass preform, wherein a flow rate of oxyhydrogen of the oxyhydrogen flame is varied to conduct the flame abrasion treatment.

BRIEF DESCRIPTION OF THE INVENTION

DETAILED DESCRIPTION OF THE INVENTION

Figure 1:
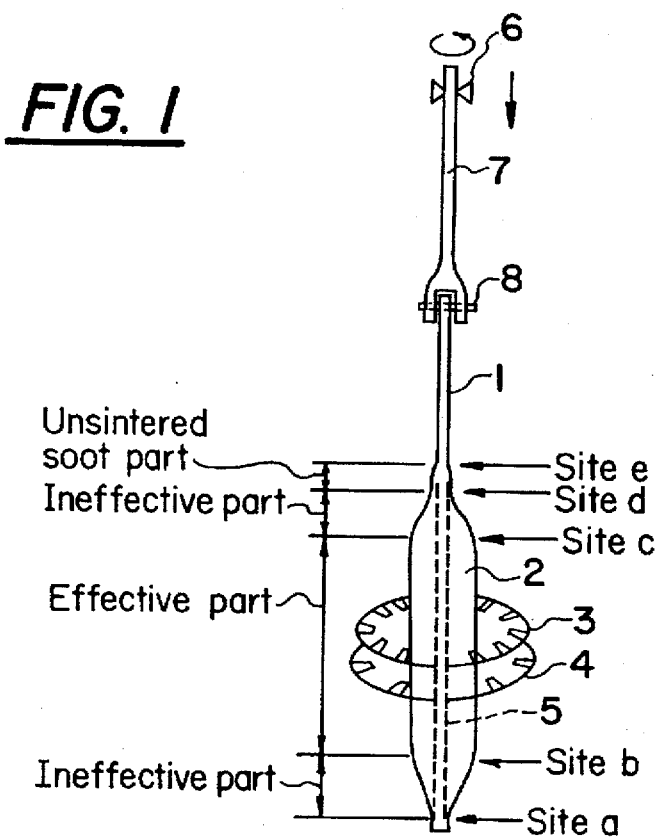
FIG. 1 is a schematic view of a preform treated according to the present invention.

In the present invention, both the velocity of movement and oxyhydrogen flow rate may be varied.

In a preferred embodiment, the flame abrasion (i.e., flame polishing and/or thermal machining) treatment can be conducted by using a first burner group comprising a plurality of oxyhydrogen burners which are positioned so that a flame jets out towards the glass preform surface in a plane perpendicular to a cylindrical axis of the glass preform and a second burner group comprising a plurality of oxyhydrogen burners which are positioned in a plane perpendicular to the cylindrical axis of the glass preform. The first and second burner groups are moved independently or in combination.

The present invention is characterized in that when the preform is vertically flame abraded, the movement velocity of the oxyhydrogen flame and/or the oxyhydrogen flow rate are varied. For example, the movement velocity is controlled or adjusted so that the velocity for flame abrading a part of the preform having a smaller outer diameter is larger than that of a part of the preform having a constant maximum outer diameter. In additional, the oxyhydrogen flow rate is controlled or adjusted so that the flow rate for flame abrading a part of the preform having a smaller outer diameter is smaller than that of a part of the preform having a constant maximum outer diameter. Finally, a combination thereof may be used.

According to the present invention, since the large glass preform is held in a vertical state, breakage of the support rod due to the preform weight can be prevented. In addition, since the support rod is connected, preferably fitting connected, with a main rod through a pin and is supported only at an upper end of the support rod, the flexure stress is not applied to the support rod. Therefore, breakage of the support rod is can be further prevented. The main rod is supported by a chuck rotating at an upper part of the main rod. The reason for this is that a large amount of the oxyhydrogen is necessary to flame abrade the large preform, and that the chuck has a temperature of at least 100° C. since a high temperature rising air flow is subjected to the chuck. Accordingly, it is necessary to account for the heat of the chuck. The temperature increase of the chuck can be prevented by increasing a distance between the preform and the chuck. In the method comprising directly fixing the support rod to the chuck, the support rod should have a length of at least 1 m so that the preform may be effectively moved relative to the burners. Further, in selecting the length of the support rod, consideration should be given to the size of the plant (i.e., the machine or equipment wherein the flame abrading is performed). When the connection is made through the pin with the main rod, the support rod attached to the upper end of the preform can have a shorter length, the transportation becomes easier, and the distance between the preform and the chuck is sufficiently long.

The ineffective parts of the preform have tapered shapes and smaller diameters than that of the effective part (the part having the constant outer diameter). When the flame abrasion of the ineffective parts are conducted by the oxyhydrogen flow, which is the same for the effective part, the surface temperature of the ineffective parts of the preform remarkably increases and the amount of vaporizing $SiO_2$ glass of the surface increases. The vaporizing glass adheres to the preform surface and remains as white powder. At the ineffective parts of the preform having the tapered shape, the oxyhydrogen flame stream flows along the taped shape so that the white $SiO_2$ powder easily remains. The adherence of the white powder can be prevented by controlling the movement velocity of the oxyhydrogen flame and/or the flow rate of the oxyhydrogen near the ineffective parts to give the ineffective parts the same glass surface temperature as that of the effective part.

The flow rate of the oxyhydrogen required to flame abrade the ineffective parts is usually at least 40%, preferably from 60 to 80% of a constant flow rate for the effective part. When the burner has the flow rate which is smaller than 40%, sufficient flame abrasion cannot be conducted so that the smooth surface is not obtained.

The unsintered soot adhered to the end of the glass preform and to the support rod can be converted to the transparent glass by increasing the movement velocity of the oxyhydrogen burner or the preform to increase the temperature near the surface to some extent and to prevent the heating of the center of support rod without elongating the support rod. The movement velocity of the oxyhydrogen burner or the preform near the end of the glass preform and the support rod is preferably from 10 mm/min to 100 mm/min, and more preferably preferably from 10 mm/min to 50 mm/min. When it is larger than 100 mm/min, the heat of the oxyhydrogen burner is not sufficiently transmitted to the surface so that the unsintered soot cannot be sufficiently converted to the transparent glass and a thermal strain of the surface can result in crack formations.

The movement velocity of the oxyhydrogen flame for the ineffective parts of the preform is preferably from 100 to 1,000%, more preferably 100 to 500%, more and most preferably 130 to 500% of the movement velocity of the oxyhydrogen flame for the effective part of the preform.

The present invention is explained with reference to the attached drawings.

FIG. 1 shows one embodiment of the present invention. In FIG. 1, a glass preform 2 is attached to a support rod 1. The glass preform 2 is prepared by the use of a starting silica rod 5. The glass preform 2 has sites a, b, c, d and e. The glass preform 2 is heated by oxyhydrogen burners 3 for flame abrasion and oxyhydrogen burners 4 for auxiliary heating. The support rod 1 is connected through a pin 8 with a main rod 7 which is held by a rotary chuck 6.

Figure 2:
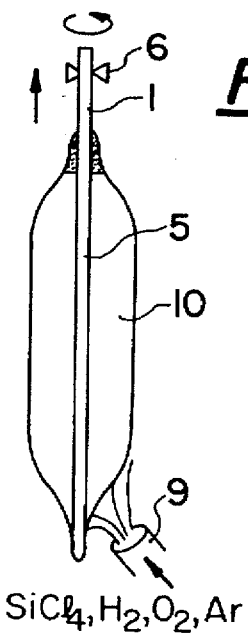
FIG. 2 is a schematic view of a depositing step of fine glass powder.

FIG. 2 shows a step for depositing fine glass powder. In order to form a porous preform (soot) 10, soot is deposited on a starting silica rod 5 by using an oxyhydrogen burner 9 for preparing soot. A support rod 1 is held by a rotary chuck 6 and is rotated.

Figure 3:
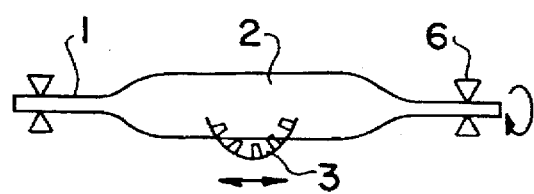
FIG. 3 is a schematic view of flame abrasion step using a conventional horizontal type lathe.

FIG. 3 shows a flame abrasion treatment using a horizontal type lathe according to the prior art. A glass preform 2 which is positioned in a horizontal direction is heated by oxyhydrogen burners 3 for flame abrasion. Rotary chucks 6 is attached to support rods 1.

PREFERRED EMBODIMENT OF THE INVENTION

The present invention will be illustrated by the following Examples which do not limit the present invention.

EXAMPLE 1

$SiCl_4$ is hydrolyzed by a VAD method to deposit pure quartz glass fine particles on a silica rod having a diameter of 30 mm so as to prepare a porous preform having a thickness of 250 mm and a length of 1,000 mm. Then, the porous preform was heated in a vacuum oven at 1600° C. to convert it to a transparent glass so as to produce a glass preform for an optical fiber having a diameter of 120 mm, a length of 900 mm and a weight of 30 kg.

A support rod having a diameter of 40 mm and a length of 500 mm which was previously attached to an upper end of the glass preform was connected through a pin with a main rod, and the main rod was held by a rotary chuck movable upward and downward, as shown in FIG. 1. The glass preform was fixed in a vertical direction. The oxyhydrogen burners were already fixed. The arrangement of the oxyhydrogen burners was such that twelve oxyhydrogen burners for flame abrasion were positioned around the preform and the six oxyhydrogen burners for auxiliary heating were positioned at a location of 80 mm below the twelve oxyhydrogen burners. The twelve burners for flame abrasion were provided with 300 L/min (for the twelve burners) of hydrogen and 100 L/min (for the twelve burners) of oxygen and the six burners for auxiliary heating were provided with 100 L/min of hydrogen and 50 L/min of oxygen. The lower part (site a) of the glass preform was the starting point for the oxyhydrogen burners for flame abrasion and the preform was moved downward at a velocity of 10 mm/min. When the oxyhydrogen burner reached the lower end (site b) of the part having a uniform thickness, the hydrogen feed was increased from 300 L/min to 400 L/min and the oxygen feed was increased from 100 L/min to 160 L/min and then the preform surface was flame abraded at the preform movement velocity of 10 mm/min until reaching the upper end (site c) of the constant part. A main object of the auxiliary burners is to remove white $SiO_2$ powder adhered to the preform surface, which powder is produced by the evaporation of the glass when the preform is flame abraded at a high temperature. When the flame reached site c, the hydrogen feed was returned to 300 L/min and the oxygen feed was returned to 100 L/min. The flame abrasion from site c to upper end (site d) of the ineffective part of the preform was conducted by controlling both of the movement velocity and the oxyhydrogen flow rate under the following conditions.

Until the time at which the burners for flame abrasion reached the site d, the hydrogen flow rate and the oxygen flow rate were gradually decreased to 100 L/min and 50 L/min respectively and the movement velocity was gradually increased from 10 mm/min to 20 mm/min. When the unsintered soot adhered to the support rod was converted to the transparent glass while the burners for flame abrasion moved from the site d to the site e, the oxyhydrogen amount supplied to the burners was kept as such and the movement velocity was increased from 20 mm/min to 40 mm/min to convert the soot to the glass. The above flow rate of the oxyhydrogen and the high movement velocity prevented the elongation of the support rod by the heating.

When the burners for flame abrasion reached the end (site e) of the sintered soot, the burner for flame abrasion was turned off to complete the flame abrasion treatment. Smoothness of the flame abraded glass preform for the glass fiber was evaluated to reveal that the preform had sufficient smoothness of not larger than 0.5 μm.

The resultant glass preform was spun to form an optical fiber having a diameter of 125 μm. The optical fiber had good strength at break of 7 kg in all length.

Comparative Example 1

The support rod attached to the glass preform having a length of 900 mm and a diameter of 120 mm, which was prepared by the VAD method in the same manner as in Example 1, was connected to the main rod through the pin and the glass preform was fixed vertically, as in the manner as in Example 1.

The arrangement of the burners was the same as that in Example 1. For the twelve oxyhydrogen burners for flame abrasion, the flow rate of hydrogen and the flow rate of oxygen were 400 L/min and 160 L/min respectively. For the six oxyhydrogen burners for auxiliary heating, the flow rate of hydrogen and the flow rate of oxygen were 100 L/min and 50 L/min respectively. The preform was traversed downward at a movement velocity of 10 mm/min while rotating the chuck when the burners for flame abrasion moved from the lower part (site a) to the upper part (site d) of the glass preform. When the oxyhydrogen burners for flame abrasion reached the site d, the flow rate of hydrogen was decreased from 400 L/min to 100 L/min, the flow rate of oxygen was decreased from 160 L/min to 50 L/min, and the movement velocity was kept at 10 mm/min. The preform was traversed downward along the unsintered soot part (from the site d to the site e). The unsintered soot was converted to the transparent glass, but the support rod was elongated near the site d of the support rod so that the diameter of the support rod was decreased from 40 mm to 20 mm.

The surface state of the glass preform was observed. In the area between sites a and b of the ineffective part of the preform, the evaporated material of the glass surface was deposited so that white powder was adhered to the preform surface.

Comparative Example 2

With respect to the glass preform prepared by a VAD method in the same manner as in Example 1 and having a length of 900 mm and a diameter of 120 mm, the rotary chuck was directly attached to the support rod. A distance between the glass preform and the chuck was 500 mm. Using the same arrangement of the oxyhydrogen burners and the same oxyhydrogen flow rate as in Example 1, a temperature of the chuck was measured, when the oxyhydrogen burners for flame abrasion reached the site c. The results are shown in Table 1. Because the chuck was positioned closely to the oxyhydrogen burners, the temperature of the chuck was increased so that a grease filler in a gear part flowed out from the gear part.

TABLE 1

| Example No. | Distance between preform and chuck | Temperature of chuck | Condition of chuck |
| --- | --- | --- | --- |
| 1 | 1,500 mm | 70° C. | Everything is all right |
| Com. 2 | 500 mm | 180° C. | The grease filled in the gear part had a decreased viscosity and flowed out from the gear part |

As described above, the Examples in which the glass preform was prepared by the VAD method are shown, but the present invention can be used for the preform prepared by the OVD method and the like. The silica glass of the starting rod may form a core alone or a core/cladding composite. The preform using an outside pipe can be used.

The flame abrasion by oxyhydrogen are shown in Examples, but a flammable gas, a flame aid gas and the like can be used instead of the hydrogen gas and the oxygen gas so that the effect of the present invention can be achieved.

According to the present invention, the danger of breakage of the support rod is diminished, and the surface of the large heavy preform can be flame abraded effectively so as to give the smooth surface, since the flame abrasion of the large heavy preform can be conducted in the state that the support rod attached to the preform upper end is connected through the pin with the main rod (glass rod) fixed by the rotary chuck.

Because the flame abrasion can be conducted with maintaining the surface temperature at the constant temperature by controlling the oxyhydrogen flow rate at the ineffective part (tapered part) of the preform, the amount of the vaporizing glass ($SiO_2$) is maintained at almost the constant value so that the amount of the white $SiO_2$ powder adhered to the preform surface can be restricted.

Since the movement velocity of the oxyhydrogen burner or the preform is increased during the conversion of the unsintered soot to the transparent glass so that the conduction of the heating to the internal part of the support rod can be prevented, the softening and elongation of the support rod due to the weight of the preform can be prevented. Accordingly, since the unsintered soot does not scatter during the drawing step of the preform, the fiber having high strength can be spun.

Namely, the smooth and clear surface can be obtained by flame abrading all the length of the heavy weight large glass preform and the unsintered part can be converted to the transparent glass. The method of the present invention is very effective for flame abrading the preform before the drawing of the preform.

What is claimed is:

1. A method for flame abrading a surface of a glass preform comprising relatively moving an oxyhydrogen flame along a length of the preform while varying a relative velocity of said movement between the preform and the oxyhydrogen flame, wherein the preform is vertically-oriented and includes a central portion having a substantially uniform maximum outer thickness and at least one tapered end portion, and wherein said step of varying the relative velocity of said movement is controlled as a function of an outer diameter of the preform so as to comprise a first relative velocity for flame abrading the central portion and a second relative velocity for flame abrading the at least one tapered end portion, said first relative velocity being lower than said second relative velocity.

2. A method according to claim 1, wherein the substantially uniform maximum outer diameter is about 250 mm.

3. A method for flame abrading a surface of a glass preform comprising:

relatively moving an oxyhydrogen flame along a length of the preform; and varying a flow rate of oxyhydrogen to the flame as a function of outer diameter of the preform, wherein the preform is vertically-oriented and includes a central portion having a substantially uniform maximum outer thickness and at least one tapered end portion, and wherein said step of varying the flow rate of the oxyhydrogen is conducted so as to comprise a first flow rate for flame abrading the central portion and a second flow rate for flame abrading the at least one tapered end portion, the first flow rate being higher than the second flow rate.

4. A method according to claim 3, wherein the substantially uniform maximum outer diameter is about 250 mm.

5. A method for flame abrading a surface of a glass preform comprising:

relatively moving an oxyhydrogen flame along a length of the preform, the preform being vertically-oriented and including a central portion having a substantially uniform maximum outer thickness and at least one tapered end portion, varying a relative velocity of said movement between the oxyhydrogen flame and the preform as a function of an outer diameter of the preform so as to comprise a first relative velocity for flame abrading the central portion and a second relative velocity for flame abrading the at least one tapered end portion, the first relative velocity being lower than the second relative velocity, and varying a flow rate of oxyhydrogen to the flame as a function of the outer diameter of the preform so as to comprise a first flow rate for flame abrading the central portion and a second flow rate for flame abrading the at least one tapered end portion, the first flow rate being higher than the second flow rate.

6. A method according to claim 5, wherein the substantially uniform maximum outer diameter is about 250 mm.

7. A method according to claim 1, 3, or 5, wherein the flame abrading is performed by using a first burner group comprising a first plurality of oxyhydrogen burners which are positioned so that the flame jets out toward the surface of the preform in a first plane perpendicular to a cylindrical axis of the preform and a second burner group comprising a second plurality of oxyhydrogen burners which are positioned in a second plane perpendicular to the cylindrical axis of the glass preform, and wherein the first and second burner groups are moved relative to the preform independently or in combination.

8. A method according to claim 1, 3, or 5, wherein the preform is vertically disposed during the flame abrading, and a support rod attached to an upper end of the glass preform is connected by a pin to a lower end of a main rod.

* * * * *